US009703777B2

(12) United States Patent
Han

(10) Patent No.: US 9,703,777 B2
(45) Date of Patent: Jul. 11, 2017

(54) TRANSLATING TEXTUAL INFORMATION OF AN APPLICATION

(71) Applicant: International Business Machines Corporation, Armonk, NY (US)

(72) Inventor: Biao Han, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/314,102

(22) Filed: Jun. 25, 2014

(65) Prior Publication Data

US 2015/0039287 A1   Feb. 5, 2015

(30) Foreign Application Priority Data

Jul. 31, 2013   (CN) .......................... 2013 1 0328433

(51) Int. Cl.
*G06F 17/28* (2006.01)
*G06F 9/44* (2006.01)

(52) U.S. Cl.
CPC .......... *G06F 17/289* (2013.01); *G06F 9/4448* (2013.01)

(58) Field of Classification Search
CPC .................................................. G06F 17/289
See application file for complete search history.

(56) References Cited

U.S. PATENT DOCUMENTS

| 7,784,026 B1 | 8/2010 | Wong |
| 8,433,718 B2 | 4/2013 | Travieso et al. |
| 2005/0066315 A1* | 3/2005 | Nguyen ............... G06F 9/4448 717/136 |
| 2006/0116864 A1* | 6/2006 | McHugh ............... G06F 17/212 704/2 |
| 2008/0082965 A1 | 4/2008 | Atkin et al. |
| 2008/0127103 A1 | 5/2008 | Bak |
| 2009/0327866 A1 | 12/2009 | Li et al. |
| 2010/0057433 A1* | 3/2010 | Jackson ................ G06F 17/28 704/3 |
| 2012/0005571 A1* | 1/2012 | Tang ..................... G06F 17/289 715/234 |
| 2013/0007588 A1 | 1/2013 | Guo et al. |
| 2013/0091425 A1 | 4/2013 | Hughes et al. |

(Continued)

OTHER PUBLICATIONS

Adewole, Ayobami, "Globalization and Localization in ASP.NET Web Applications", accessed at: http://www.codeproject.com/Articles/325222/Globalization-and-Localization-in-ASP-Net-web-appl, Feb. 6, 2012, 6 pages.

(Continued)

*Primary Examiner* — Ibrahim Siddo

(74) *Attorney, Agent, or Firm* — Cantor Colburn LLP

(57) ABSTRACT

Embodiments relate to translating textual information of an application. In one aspect, a method includes running the application based on a source language and receiving a request for translating the textual information from the source language into a target language. In response to the request, the method includes acquiring a text location identifier of the textual information of the application, and translating the textual information from the source language to the target language based on a text location identifier-target language content mapping table.

20 Claims, 9 Drawing Sheets

(56) References Cited

U.S. PATENT DOCUMENTS

2015/0161160 A1\* 6/2015 Chen ................ G06F 17/30174
　　　　　　　　　　　　　　　　　　　　　　707/639

OTHER PUBLICATIONS

"Method for the Language Translation of Existing Websites by Injection of a Dynamic Translation Client", accessed at http://ip.com/IPCOM/000198273, IP.com Disclosure No. IPCOM000198273D Publication Date: Aug. 2, 2010, 4 pages.
Sharma, M.K., et al., "Accessing Dynamic Web Page in Users Language", accessed at http://ieeexplore.ieee.org/xpl/articleDetails.jsp?tp=&arnumber=5783859&queryText%3DDownloading+the+web+page+in+translated+language , Students' Technology Symposium (TechSym), 2011 IEEE Date of Conference: Jan. 14-16, 2011, 4 pages.

\* cited by examiner

Log in comments

E-mail address

|                                      |

Password

|                                      |

Use My Organization's Login

| Log in |  Forgot password?

Sign Up
Not a member yet? Sign up to get an account.

Hold a Sametime Unite Meeting
Customers can still use online meetings and events from Sametime Unite.

Check the Maintenance Schedule

---

Anmelden

E-Mail-Adresse:

|                                      |

Kennwort:

|                                      |

Anmeldeseite meines Unternehmens verwenden

| Anmelden |  Kennwort vergessen?

Anmelden
Noch kein Mitglied? Melden Sie sich für ein Konto an.

Sametime Unyte-Besprechung organisieren
Kunden können von Sametime Unyte aus nach wie vor Onlinebesprechungen und Ereignisse verwenden.

Verwaltungsplan überprüfen

Fig. 2

TRANSLATING TEXTUAL INFORMATION OF AN APPLICATION

PRIORITY

This application claims priority to Chinese Patent Application No. 201310328433.5, filed Jul. 31, 2013, and all the benefits accruing therefrom under 35 U.S.C. §119, the contents of which in its entirety are herein incorporated by reference.

BACKGROUND

The present invention relates to information processing technology, and more specifically, to a method and system for translating textual information of an application.

During internationalized software development, software developers often process software issues in a particular language environment. For example, as shown in FIG. 2, a software engineer who only understands English may be required to reproduce a problem found in a test or a problem fed back from a customer in a foreign language environment (e.g., shown in FIG. 2 as a German environment). The reproducing steps are often very complex, and it is not only time-consuming but also can be error-prone for an engineer to perform these steps in a totally unfamiliar foreign interface. Besides, in the case where the program does not present some foreign language information prompt according to a predetermined design, the engineer may be unable to determine the cause for the program abnormality.

When designing a software interface, a software interface designer needs also to consider the influence of different languages on a software interface layout. For example, a segment of text that may be displayed in only one line in an English environment might occupy two lines of space in a Greece environment. In order to solve these problems, one approach is to hire engineers conversant in both English and Germany, which can result in increased labor costs. Further, it may be difficult to find talents conversant in two or more languages.

Another approach is to use translation tools such as Google® translation or lexicons to translate the displayed German interface, which may be more convenient than the first approach, however, the translations are not always accurate and often still require some human interpretation.

SUMMARY

According to one aspect of the present invention, there is provided a method for translating textual information of an application. The method includes running the application, via a computer processor, based on a source language and receiving a request for translating the textual information from the source language to a target language. In response to the request, the method includes acquiring a text location identifier of the textual information of the application, and translating, via the computer processor, the textual information from the source language to the target language based on a text location identifier-target language content mapping table.

According to additional embodiments, a system and computer program product are also provided.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 2 shows different language testing environments to which a software testing engineer faces.

DETAILED DESCRIPTION

Figure 1:
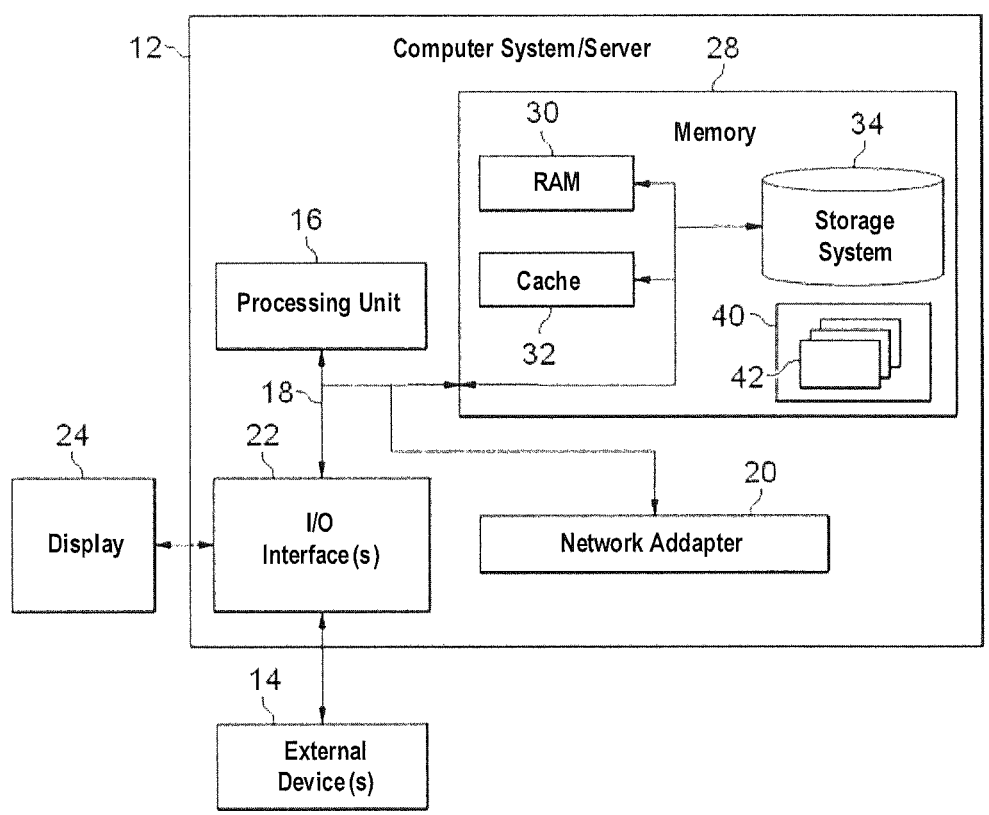
FIG. 1 shows an exemplary computer system/server 12 which is applicable to implement the embodiments of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, in some embodiments, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated data signal may take any of a variety of forms, including, but not limited to, an electro-magnetic signal, optical signal, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implements the function/act specified in the flowchart and/or block diagram block or blocks.

The computer program instructions may also be loaded onto a computer, other programmable data processing apparatus, or other devices to cause a series of operational steps to be performed on the computer, other programmable data processing apparatus or other devices to produce a computer implemented process such that the instructions which execute on the computer or other programmable apparatus provide processes for implementing the functions/acts specified in the flowchart and/or block diagram block or blocks.

Various embodiments of the embodiments described herein provide for translation of textual information of an application. The embodiments may result in relatively lower translation costs and higher translation accuracy, as compared with current techniques.

Referring now to FIG. 1, in which a block diagram of an exemplary computer system/server 12 which is applicable to implement some embodiments is shown. Computer system/server 12 shown in FIG. 1 is only illustrative and is not intended to suggest any limitation as to the scope of use or functionality of embodiments described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 and processing units 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 1 and typically called a "hard drive"). Although not shown in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 3A:
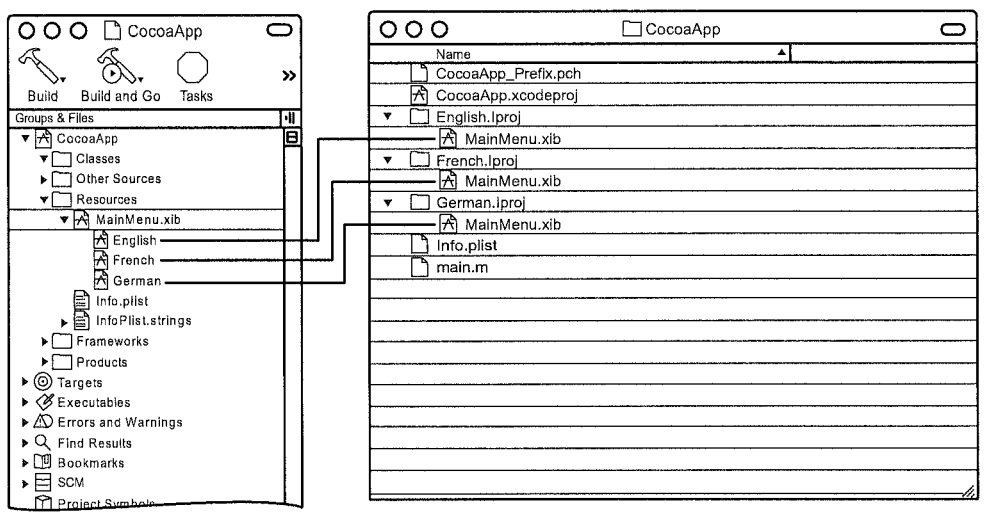
FIGS. 3*a*, 3*b*, and 3*c* show instances of resource files in various languages.
Figure 3B:
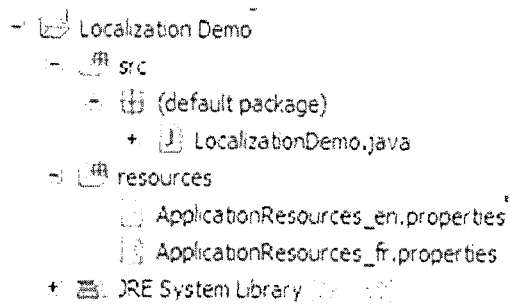
Figure 3C:

In current software multi-lingual support implementations, a language resource file-based identifier mapping method is sometimes used, wherein the textual information which needs to be displayed in the software interface is extracted into an independent language resource file. Each language has its own resource file. In software code, the place originally for displaying textual information will be replaced by a globally unique text key corresponding to the textual information. The language resource file saves a mapping relationship between text keys and textual information. The same text key would correspond to different textual contents in different language resource files. These resource files are distinguished through file names including language code information or through being placed in different directories including language code information. When the program starts, which language resource file should be loaded will be determined based on a user's current language (which may be called source language) setting. After being loaded into the application, the language resource file often exists in the form of Map. When the program interface is rendered, the textual content corresponding to the text key in the Map will be read and then displayed on the interface. For example, FIGS. 3a, 3b, and 3c show instances of various kinds of language resource files in iPhone®, Java®, and Flex®, respectively. Long-term software testing practices reveal that expressions of the same textual information in these language resource files are very accurate in various languages, and these contents are already available to program developers or testers. The ability to fully utilize these resources to solve the translation issues encountered by a tester in a language environment unfamiliar thereto, can offer many advantages, which are realized by the embodiments described herein.

Figure 4:
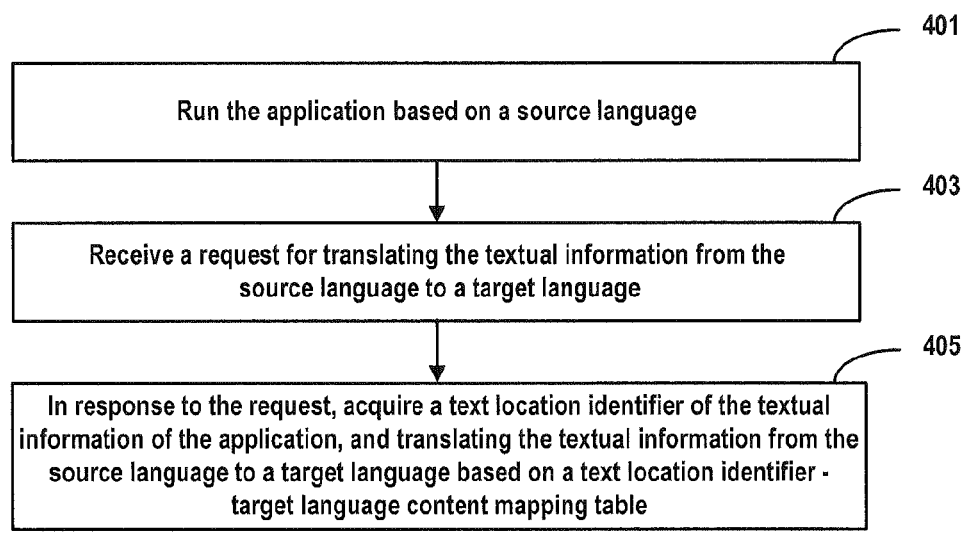
FIG. 4 shows a method for translating textual information of an application according to one specific embodiment.

FIG. 4 shows an embodiment for translating textual information of an application. In step 401, the application is run based on a source language. In an application testing environment, sometimes an application developer has to test the software in a language environment unfamiliar thereto. Initially, such language which the application tester is unfamiliar or not conversant with may be used as the source language. The reason why the application tester is subject to this situation lies in that the software tester wishes to reproduce relevant problems most likely occurring to the software in a most true environment. Although the present disclosure describes application testing as an application scenario to depict various embodiments in detail, the application scenario described herein is not merely limited to the application testing environment. For example, a common user of an application might also need to use the application (particularly for employees in some international companies) in an unfamiliar language environment. Even if the user is very familiar with the application, he/she might also have a need of translating the unfamiliar source language information into a more familiar language. Generally, an application user might select a source language for running the application before the application runs, or re-selects the running source language after the application runs. In step 403, a request for translating the textual information from the source language to a target language is received. Likewise, for running the application, the application user may select a target language into which the source language should be translated before the application runs, or re-select the target language for the translation after the application program runs, wherein the target language is a language more familiar to the application user or his/her mother language. Of course, the application user may selectively request to translate a single piece or part of textual information of the application into the target language. Step 405 relates to, responsive to the request, acquiring a text location identifier (ID) of the textual information of the application, and translating the textual information from the source language to the target language based on a text location identifier-target language content mapping table. After acquiring the text location identifier of the textual information, a corresponding target language content is retrieved in the text location identifier-target language content mapping table using the text location identifier; and the target language content is determined as a translation result of the textual information. Here, the text location identifier is an identifier for determining the location of the textual information in an object structure of the application. One piece of textual information has a globally unique text location identifier. In an embodiment, the text location identifier-target language content mapping table is generated based on the text location identifier of the textual information of the application, the text key corresponding to the textual information, and the target language content corresponding to the text key in the target language resource file. In this embodiment, the target language content corresponding to the textual information in the target language resource file may be found utilizing the uniqueness of the text key in the language resource file and the uniqueness of the text location identifier in the application, and based thereupon, the text location identifier-target language content mapping table is generated. As to how to specifically generate the text location identifier-target language content mapping table, the present application will be illustrated through the following embodiments.

Figure 5:
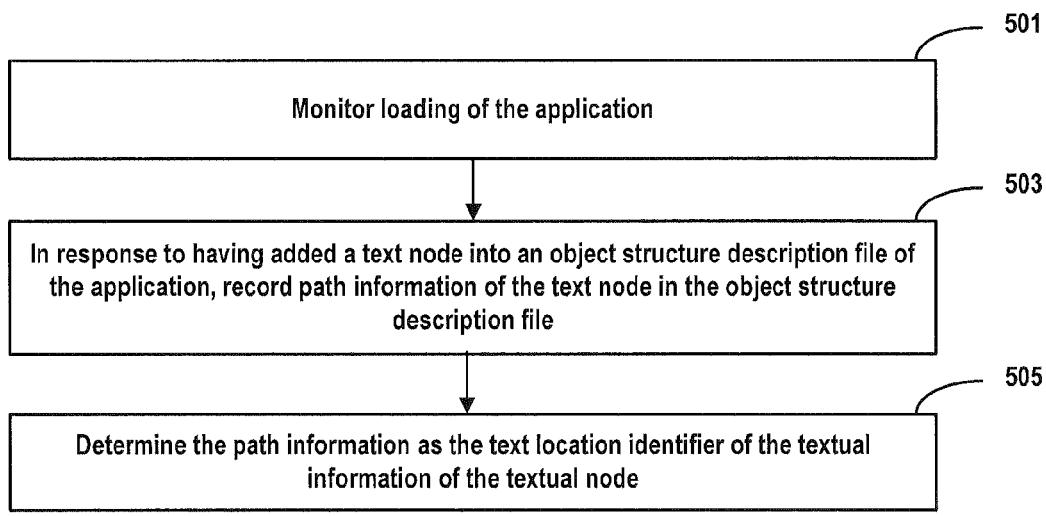
FIG. 5 shows a specific embodiment of how to acquire a text location identifier of textual information of the application.
Figure 6:
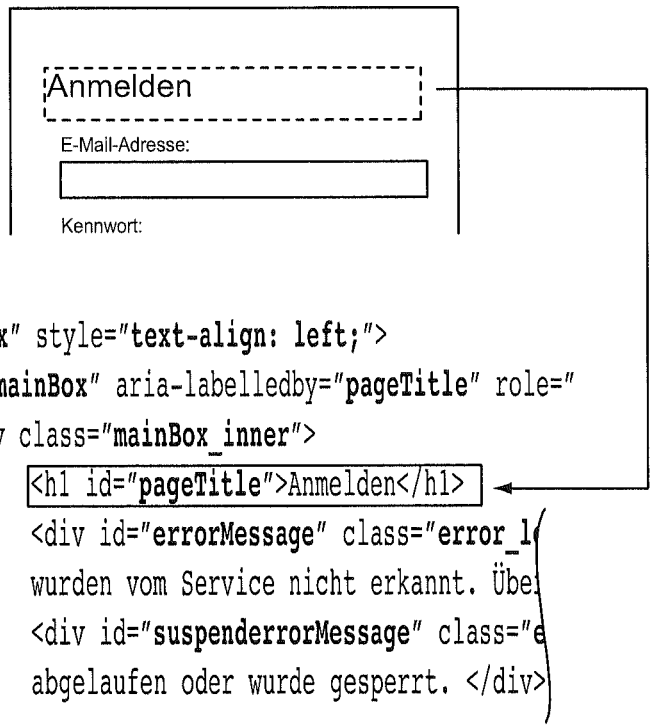
FIG. 6 shows an instance of a correspondence relationship between textual information and a DOM Tree.

Generation of the text location identifier-target language content mapping table needs to be based on the text location identifier of the textual information of the application, the text key corresponding to the textual information, and the target language content corresponding to the text key in the target language resource file. FIG. 5 shows a specific embodiment of how to acquire a text location identifier of textual information of the application. In step 501, loading of the application is monitored. Those skilled in the art would understand, various means may be used to monitor loading of an application. For example, when a network web application browser changes at a DOM Tree node, a corresponding event will be released, then such event may be subscribed by using a JavaScript® program, with corresponding processing logic being realized; for other interface program, for example, an interface realized by Java Swing®, it is likely possible to release corresponding update events when adding, updating, and removing an interface component. Therefore, these events may also be subscribed and processed using a programming manner. For a Windows® operating system, the system provides a dynamic link library (DLL) to render the interface, such that during the implementation process, the exposed interfaces of these DLLs may be packaged to add required monitor logic. In step 503, in response to having added a text node into an object structure description file of the application, path information of the text node in the object structure description file is recorded. The so-called path information refers to a unique identifier of certain textual information in the current application interface. Through this identification, the application may quickly and conveniently locate the location of the text in the application. In a Web application, the path information may be implemented as an XPath (XML Path Language), which is a language for determining the location of a certain portion in an XML document. Here, the object structure description file is for describing a program interface layout, location of each component, and data structure of pattern information. In the Web application, the object structure description file is implemented as a DOM Tree. In an Android® program, the object structure description file is implemented as a series of XML files under the directory of res\layout. With the Web application as an example, for loading of each page, an object structure description file, i.e., document object model tree DOM Tree, would be generated. Since those skilled in the art are familiar with DOM Tree, it will not be detailed here. FIG. 6 shows an association relationship between a text node "Anmelden" ("Anmelden" is textual information (content) of the node expressed in German) and its corresponding DOM Tree. In the DOM Tree, the path information of the text node "Anmelden" is //*[@id="pageTitle"]. This path information is unique in the DOM Tree and also unique globally. In step 505, the path information is determined as the text location identifier of the textual information of the text node. Since this path information is globally unique, it may be used to characterize the text location identifier of the textual information of the text node, which indicates the location of the textual information in the structure of the application. In this way, the text location identifier of the textual information is acquired.

Figure 7:
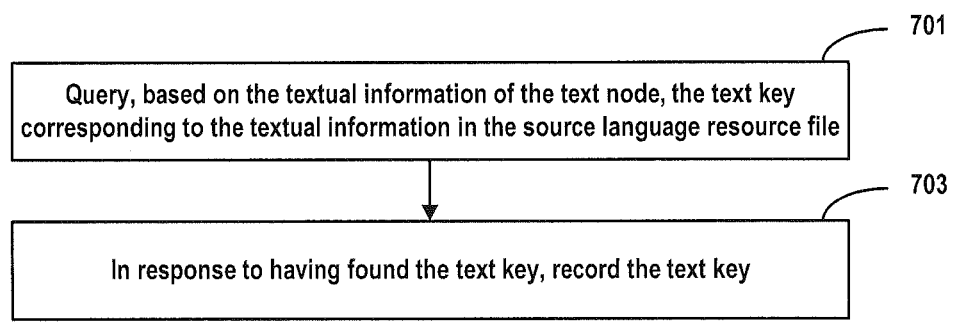
FIG. 7 shows one specific embodiment of acquiring a text key of literal information.

In an embodiment, a globally unique text key corresponding to the textual information in the language resource file may be further determined. FIG. 7 shows a specific embodiment of acquiring a text key of textual information. In step 701, a text key corresponding to the textual information in a source language resource file is queried based on textual information of the text node. As above mentioned, in a specific language resource file, text keys and textual information expressed in the language have a one-to-one mapping manner. If the textual information expressed in a source language is already known, a corresponding text key may be searched in the language resource file by using the textual information. Generally speaking, the source language resource file and the target language resource file may be loaded locally or acquired from a remote server but loaded locally. The present invention has no specific requirement on the deployment of the language resource file. In step 703, the text key is recorded in response to having found the text key. In this way, the text key corresponding to the textual information is acquired.

Figure 8:
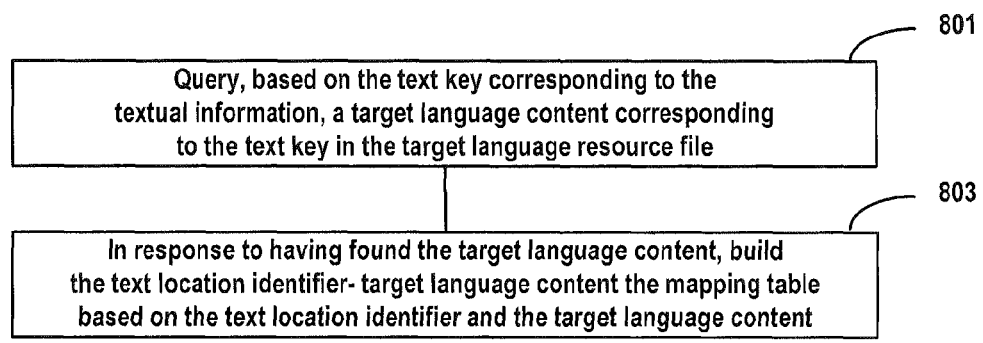
FIG. 8 shows one specific embodiment of building the text location identifier-target language content mapping table.

FIG. 8 shows a specific embodiment of building the text location identifier-target language content mapping table. In step 801, the target language content corresponding to the text key is queried in a target language resource file based on a text key corresponding to the textual information. Since the textual information corresponds to a globally unique text key while the target language resource file is likely constructed by the text key and the textual information expressed by the target language, the text key may be used as an index to perform query in the language resource file. In step 803, in response to having found the target language content, the text location identifier-target language content mapping table is built based on the text location identifier and the target language content. After the one-to-one correspondence relationship between the text location identifier and the target language content is determined, each entry in the text location identifier-target language content mapping table may be built based on the one-to-one correspondence relationship, thereby forming the text location identifier-target language content mapping table. In an embodiment, the mapping table may only be built for part or all textual information on the application interface, or built for all textual information of the application. The generated mapping table is shown in Table 1.

TABLE 1

| Serial Number | Text location identifier | Text content in target language |
|---|---|---|
| 1 | //*[@id="pageTitle"] | Log In |
| 2 | /html/body/div[2]/div/div/div/form/fieldset/div/a | Use My Organization's Login |
| . . . | . . . | . . . |

Generally, with relevant operations of the user, the object description structure files of the application will change constantly. In this case, it is required to monitor a change of the object structure description file and in response to a change having occurred in the text node in the object structure description file, modify the text location identifier-target language content mapping table. In this way, it is guaranteed that the mapping table often synchronously reflects the current interface content. Here, the modifying the text location identifier-target language content mapping table comprises updating, adding, and deleting an entry in the text location identifier-target language content mapping table. Hereinafter, it would be illustrated how to modify the entry with the Web application as an example:

1. Add an Entry

When a Web application is loaded by a browser, with the initialization of the DOM tree, the text nodes used in a program initialization interface will be created one by one. When creating a node, the browser releases a text node adding event. Through subscribing to all text node adding events, once a node is created, the text location identifier of the text can be acquired from the event released by the browser. Meanwhile, a program context for adding the text node would be read from a Javascript program call stack. A text key may be acquired from the context; then, a target language resource file may be queried through the text key, thereby acquiring the textual content corresponding to the text key. With the text location identifier and the target language text content, a new entry may be built in the mapping table.

2. Update an Entry

During running of a Web application, contents of some text nodes will change constantly. For example, a certain text node is for displaying user operation prompt information; then each time when the user has a new operation, the content of the text node will be updated. When the node content is updated, the browser will likewise release a text node update event. Through subscribing to such events, once there is a node being updated, a text location identifier of the text node is acquired from an event released from the browser. Meanwhile, a program context for adding the text node would be read from a Javascript program call stack. A new text key may be acquired from the context; then, a target language resource file may be queried through the new text key, thereby acquiring the textual content corresponding to the new text key. With the text location identifier and the new target language text content, the entry, in the mapping table, corresponding to the text location identifier may be updated.

3. Delete an Entry

During running of a Web application, a DOM node might be deleted. For example, when a user closes a dialog box on a Web interface, the DOM node corresponding to the dialogue box needs to be deleted from the DOM tree, and the corresponding entry, in the mapping table, needs also to be removed. When deleting a text node, the browser would likewise release a text node delete event. Through subscribing to such events, once there is a node being deleted, a text location identifier of the text node is acquired from an event released from the browser. With the text location identifier, an entry, in the mapping table, corresponding to the text location identifier may be deleted. Based on the present disclosure, those skilled in the art may also devise modifying the mapping table of other type of application.

Figure 9:
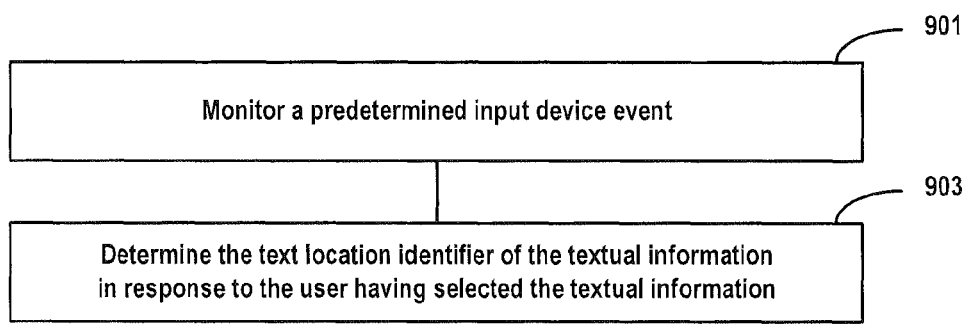
FIG. 9 shows one specific embodiment of how to acquire a text location identifier of textual information of the application through an input device.

FIG. 9 shows a specific embodiment of how to acquire a text location identifier of textual information of the application through an input device. In step 901, a predetermined input device event is monitored. With the Web application as an example, mouse events such as onMouseOver, onMouseDown, and onMouseUp of all DOM nodes in the entire page are monitored. Those skilled in the art would appreciate that there are also corresponding relevant events for other input devices, which will not be detailed here. In step 903, a text location identifier of the textual information is determined in response to the user having selected the textual information. When the users select an associated textual information by using an input device (the user's selection may be a mouse hovering over the textual information, or a mouse clicking onto or double-clicking onto this place, etc.), a corresponding input device event would occur; and once the corresponding event occurs, the browser will package an event object Event to an event handling program. With mouse clicking as an example, this event includes information such as the location (clientX and clientY) of the mouse licking, the DOM node object (target) where the clicking location is located. For each DOM node object, its parent Node (parentNode) may be acquired, till the top level document object. In this way, through the DOM node object packaged by the event object, a text location identifier of the textual information selected by the user may be acquired. Besides, for other non-Web applications, an event drive model similar to Web, for example, Java Swing, is often adopted on the user interaction interface. Likewise, regarding data structures similar to event object, event monitor, and event source, this method is universal.

Figure 10:
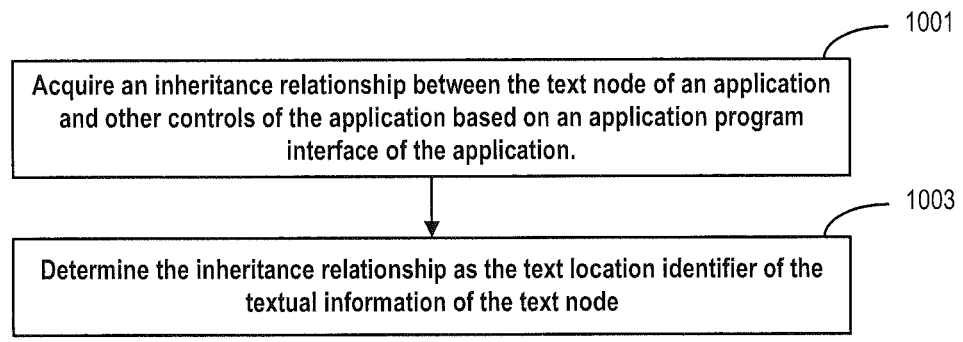
FIGS. 10 and 11 show another embodiment of how to acquire a text location identifier of textual information of the application.
Figure 11:
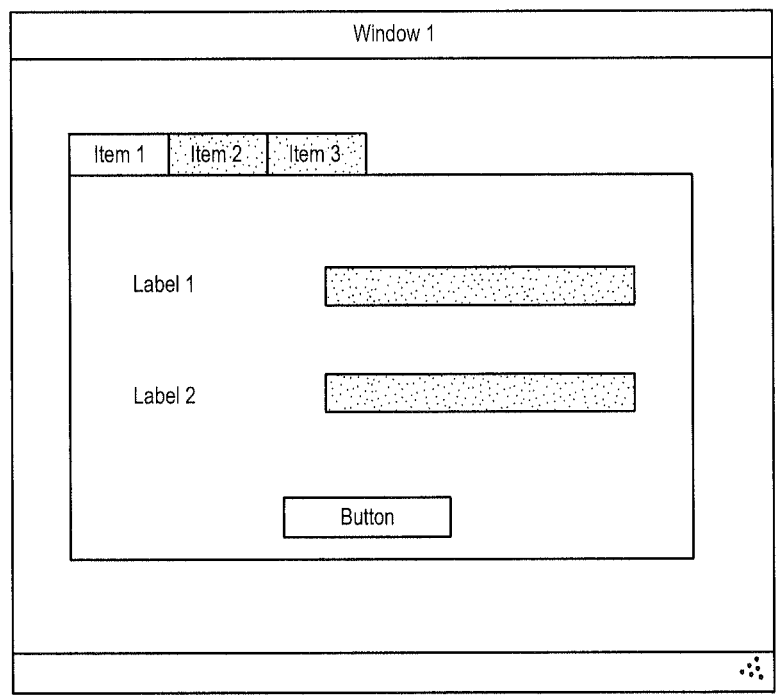

It has been depicted how to acquire a text location identifier of textual information of an application with reference to FIG. 5 mainly with web application as an example. FIGS. 10 and 11 show further specific embodiments of how to acquire a text location identifier of textual information of an application. In step 1001, an inheritance relationship between a text node of an application and other controls of the application is acquired based on an application program interface (API) of the application. In step 1003, the inheritance relationship is determined as the text location identifier of the textual information of the text node. What has been depicted above is a method of depicting a text location ID through a text path of the DOM Tree, which is not only applicable to a common Web application development, but also applicable to all other applications that use HTLM techniques to render a user interaction interface, typically including: Android and IOS applications implemented by using a Web View control, and some traditional Java GUI (graphical user interface) controls supporting HTML rendering. However, for earlier GUI controls not supporting HTML, the text location ID may be depicted through the inheritance relationship between controls. As shown in FIG. 11, in Window 1, each control has its own identifier ID. The control of Window 1 comprises a Tab Navigation control that comprises three tab panels, i.e., item 1, item 2, item 3. Item 1 further comprises two labels, i.e., Label 1, Label 2. Then, the text location ID of Label1 may be uniquely identified by Window1 ID+item1 ID+Label1 ID. Likewise, a text location identifier-target language content mapping table corresponding to Window 1 may be built according to the above introduced method. After the user selects the content of Label 1, the mouse event is captured. It is known from the mouse event object that the selected textual information is currently located at Label1. Through the APIs provided by the GUI controls, the dependency relationship between the controls is: the container of Label1 is item 1, while the container of Item 1 is Window 1. In this way, the text location identifier ID of Label 1 is obtained. Through the text location ID and the text location identifier-target language content mapping table, a translation of the textual information in the target language is derived. It should be noted that for Window 1, when it is being loaded, an object structure description file may be generated; and likewise, change of an object inside Window 1 may be monitored and responded to through packaging the system interface or directly invoking the system API, and the object structure description file and the text location identifier-target language content mapping table may be modified.

Figure 12:
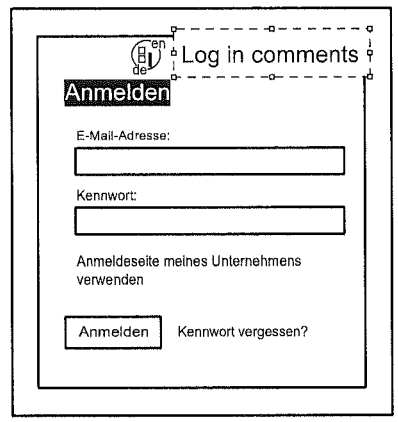
FIG. 12 shows one specific embodiment of displaying a translation result.

FIG. 12 shows a specific output interface applying some embodiments. The textual information is textual information located on a user interface of an application. By displaying the textual information that has been translated into the target language, the user may better use or test the application. FIG. 12 displays the corresponding translated content in the target language by a floating tag near the textual information. Of course, the translated content may be displayed by lateral or longitudinal separation in the same window, or displayed in a further window. Those skilled in the art may devise various manners appropriate to displaying the translated contents based on the present application.

Figure 13:
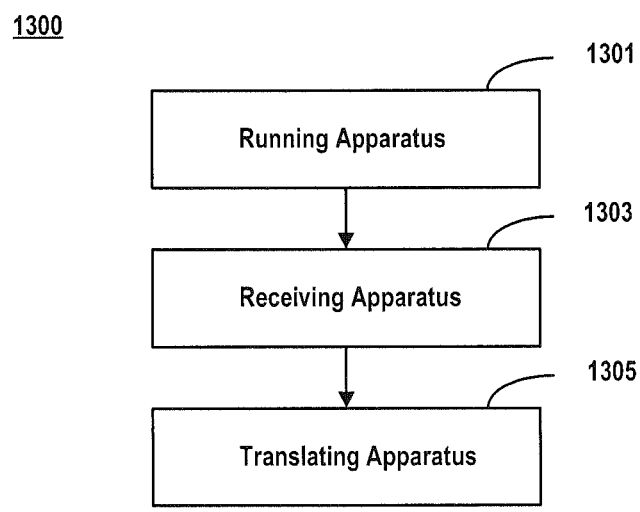
FIG. 13 shows a block diagram of a system for translating textual information of an application according to an embodiment.

FIG. 13 shows block diagram of a system for translating textual information of an application. The system 1300 for translating textual information of an application includes a running apparatus 1301 configured to run the application based on a source language, a receiving apparatus 1303 configured to receive a request for translating the textual information from a source language to a target language, and a translation apparatus 1305 configured to in response to the request, acquire a text location identifier of the textual information of the application, and translate the textual information from the source language into the target language based on a text location identifier-target language content mapping table. Implementations of the above apparatuses have been depicted above through various specific embodiments, which will not be detailed here.

In an embodiment, the system 1300 further includes a mapping table generation apparatus configured to generate the text location identifier-target language content mapping table based on the text location identifier of the textual information of the application, a text key corresponding to the textual information, and a target language content corresponding to the text key in the target language resource file.

In an embodiment, the system 1300 further includes a monitoring apparatus configured to monitor loading of the application, a path information recording apparatus configured to in response to having added a text node into an object structure description file of the application, record path information of the textual node in the object structure description file, and a text location identifier determining apparatus configured to determine the path information as the text location identifier of the textual information of the text node.

In an embodiment, the system 1300 further includes an inheritance relationship acquiring apparatus configured to acquire an inheritance relationship between a text node of the application and other controls of the application based on an application program interface of the application, and a second text location identifier determining apparatus configured to determine the inheritance information as the text location identifier of the textual information of the text node.

In an embodiment, the system 1300 further includes a query apparatus configured to query a text key corresponding to the textual information in a language resource file of the source language based on the textual information of the text node, and a text key recording apparatus configured to record the text key in response to having found the text key.

In an embodiment, the system 1300 further includes a target language content query apparatus configured to query a target language content corresponding to the text key in a language resource file in the target language based on the text key corresponding to the textual information, and a building apparatus configured to build the text location identifier-target language content mapping table based on the text location identifier and the target language content in response to having found the target language content.

In an embodiment, the system 1300 further includes a change monitoring apparatus configured to monitor a change of the object structure description file, and a modifying apparatus configured to modify the text location identifier-target language content mapping table in response to a change having occurred in a text node in the object structure description file.

In an embodiment, the application is a web application, and the object structure description file is a document object model tree.

In an embodiment, the translation apparatus further includes an event monitoring apparatus configured to monitor a predetermined input device event, and a text location identifier acquiring apparatus configured to acquire the text location identifier of the textual information in response to a user having selected the textual information.

In an embodiment, the textual information is textual information located on a user interface of the application, and the system 1300 further includes a displaying apparatus configured to display the textual information that has been translated into the target language on the user interface.

In an embodiment, the translating apparatus includes a retrieving apparatus configured to retrieve a corresponding target language content in the text location identifier-target language content mapping table using the text location identifier, and a translation determining apparatus configured to, in response to having found the target language content, determine the target language content as a translation result of the textual information.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable those having ordinary skill in the art to understand the embodiments disclosed herein.

The invention claimed is:

1. A method for translating textual information of an application, comprising:
    running the application, via a computer processor, based on a source language;
    receiving a request for translating the textual information from the source language to a target language; and
    in response to the request:
        acquiring a text location identifier of the textual information of the application, the text location identifier being a globally unique identifier that determines a location of the textual information in an object structure of the application; and
        translating via the computer processor, the textual information from the source language to the target language based on a text location identifier to target language content mapping table, wherein the translating comprises dynamically updating a text node based on a user operation during an execution of a web application; and acquiring, via the computer processor, the text location identifier from an event released from a browser, while simultaneously reading a program context for adding the text node from a program call stack.

2. The method according to claim 1, further comprising:
generating the text location identifier to target language content mapping table based on a text location identifier of the textual information of the application, a text key corresponding to the textual information, and a target language content corresponding to the text key in a target language resource file.

3. The method according to claim 1, further comprising:
monitoring loading of the application;
in response to having added the text node into an object structure description file of the application, recording path information of the text node in the object structure description file; and
determining the path information as the text location identifier of the textual information of the textual node.

4. The method according to claim 1, further comprising:
acquiring an inheritance relationship between the text node of the application and other controls of the application based on an application program interface of the application; and
determining the inheritance relationship as the text location identifier of the textual information of the text node.

5. The method according to any of claim 1, further comprising:
querying, based on the textual information of the text node, the text key corresponding to the textual information in the source language resource file; and
in response to having found the text key, recording the text key.

6. The method according to claim 5, further comprising:
querying, based on the text key corresponding to the textual information, a target language content corresponding to the text key in the target language resource file; and
in response to having found the target language content, building the text location identifier to target language content mapping table based on the text location identifier and the target language content.

7. The method according to claim 6, further comprising:
monitoring a change of the object structure description file;
in response to a change having occurred in the text node in the object structure description file, modifying the text location identifier to target language content mapping table.

8. The method according to claim 3, wherein the application is a web application, and the object structure description file is a document object model tree.

9. The method according to claim 1, wherein the acquiring a text location identifier of the textual information of the application further comprises:
monitoring a predetermined input device event; and
determining the text location identifier of the textual information in response to a user having selected the textual information.

10. The method according to claim 1, wherein the textual information is textual information located on a user interface of the application, the method further comprising:
displaying the textual information that has been translated into the target language onto the user interface.

11. The method according to claim 1, wherein the translating the textual information from the source language to the target language based on the text location identifier to target language content mapping table comprises:
retrieving a corresponding target language content in the text location identifier to target language content mapping table using the text location identifier; and
in response to having found the target language content, determining the target language content as a translation result of the textual information.

12. A system for translating textual information of an application, comprising:
a processor configured to:
run an application based a source language;
receive a request for translating textual information from the source language to a target language;
in response to the request, acquire a text location identifier of the textual information of the application,
translate the textual information from the source language to the target language based on a text location identifier to target language content mapping table;
dynamically update a text node based on a user operation during an execution of a web application, and the text location identifier being a globally unique identifier that determines a location of the textual information in an object structure of the application; and
acquire the text location identifier from an event released from a browser, while simultaneously reading a program context for adding the text node from a program call stack.

13. The system according to claim 12, wherein the processor is further configured to:
generate the text location identifier to target language content mapping table based on the text location identifier of the textual information of the application, a text key corresponding to the textual information, and a target language content corresponding to the text key in a target language resource file.

14. The system according to claim 12, wherein the processor is further configured to:
monitor loading of the application;
in response to having added the text node into an object structure description file of the application, record path information of the text node in the object structure description file; and
determine the path information as the text location identifier of the textual information of the text node.

15. The system according to claim 12, wherein the processor is further configured to:
acquire an inheritance relationship between the text node of the application and other controls of the application based on an application program interface of the application; and
determine the inheritance relationship as the text location identifier of the textual information of the text node.

16. The system according to any of claim 12, wherein the processor is further configured to:
query, based on the textual information of the text node, the text key corresponding to the textual information in a source language resource file; and
record the text key in response to having found the text key.

17. The system according to claim 16, wherein the processor is further configured to:
query a target language content corresponding to the text key in a target language resource file based on the text key corresponding to the textual information; and
in response to having found the target language content, build the text location identifier to target language content mapping table based on the text location identifier and the target language content.

18. The system according to claim 17, wherein the processor is further configured to:
- monitor a change of the object structure description file; and
- in response to a change having occurred in the text node in the object structure description file, modify the text location identifier to target language content mapping table.

19. The system according to claim 12, wherein the processor is further configured to:
- monitor a pre-determined input device event; and
- acquire the text location identifier of the textual information in response to a user having selected the textual information.

20. A computer program product for translating textual information of an application, the computer program product comprising a computer readable storage medium having program instructions embodied therewith, the program instructions executable by a computer to cause the computer to perform a method comprising:
- running the application based on a source language;
- receiving a request for translating the textual information from the source language to a target language; and
- in response to the request:
  - acquiring a text location identifier of the textual information of the application, the text location identifier being a globally unique identifier that determines a location of the textual information in an object structure of the application; and
- translating via the computer processor, the textual information from the source language to the target language based on a text location identifier to target language content mapping table, wherein the translating comprises dynamically updating a text node based on a user operation during an execution of a web application; and
- acquiring, via the computer processor, the text location identifier from an event released from a browser, while simultaneously reading a program context for adding the text node from a program call stack.

* * * * *